(12) United States Patent
Beale et al.

(10) Patent No.: US 12,353,900 B2
(45) Date of Patent: Jul. 8, 2025

(54) SYSTEM AND METHOD ENABLING SOFTWARE-CONTROLLED PROCESSOR CUSTOMIZATION FOR WORKLOAD OPTIMIZATION

(71) Applicant: Unisys Corporation, Blue Bell, PA (US)

(72) Inventors: Andrew Ward Beale, Irvine, CA (US); David Strong, Irvine, CA (US)

(73) Assignee: Unisys Corporation, Blue Bell, PA (US)

( * ) Notice: Subject to any disclaimer, the term of this patent is extended or adjusted under 35 U.S.C. 154(b) by 625 days.

(21) Appl. No.: 17/194,478

(22) Filed: Mar. 8, 2021

(65) Prior Publication Data

US 2022/0283838 A1 Sep. 8, 2022

(51) Int. Cl.
*G06F 9/455* (2018.01)
*G06F 9/30* (2018.01)
*G06F 9/38* (2018.01)
*G06F 9/48* (2006.01)

(52) U.S. Cl.
CPC ...... *G06F 9/45558* (2013.01); *G06F 9/30112* (2013.01); *G06F 9/3851* (2013.01); *G06F 9/4881* (2013.01); *G06F 2009/4557* (2013.01); *G06F 2009/45583* (2013.01)

(58) Field of Classification Search
CPC ............ G06F 9/45558; G06F 9/30112; G06F 9/4881; G06F 2009/4557; G06F 2009/45583
See application file for complete search history.

(56) References Cited

U.S. PATENT DOCUMENTS

| | | | |
|---|---|---|---|
| 5,621,912 A * | 4/1997 | Borruso | G06F 11/3093 718/1 |
| 8,266,629 B2 * | 9/2012 | Inoue | G06F 9/544 718/1 |
| 2006/0225061 A1 * | 10/2006 | Ludwig | G06F 8/441 717/161 |
| 2016/0147555 A1 * | 5/2016 | Hepkin | G06F 9/44 718/1 |
| 2019/0205110 A1 * | 7/2019 | Liu | G06F 8/48 |
| 2020/0042338 A1 * | 2/2020 | Poothia | G06F 12/023 |

* cited by examiner

*Primary Examiner* — Wissam Rashid
(74) *Attorney, Agent, or Firm* — Shook, Hardy & Bacon

(57) ABSTRACT

A system and method for virtual processor customization based upon the particular workload placed upon the virtual processor by one or more execution contexts within a given program or process. The customization serves to optimize the virtual processor architecture based upon a determination as to the size and/or type or virtual execution registers optimally suited for supporting a given execution context. This results in a time-variant processor architecture which not only provides optimized computational attributes, but also affords a high degree of inherent process security.

19 Claims, 8 Drawing Sheets

SYSTEM AND METHOD ENABLING SOFTWARE-CONTROLLED PROCESSOR CUSTOMIZATION FOR WORKLOAD OPTIMIZATION

BACKGROUND OF THE INVENTION

In the field of microprocessor system architecture and design, maximizing the utilization of the processing capabilities of a given processor core is a crucial with respect to the performance and productivity of a computing system. One of the most widely utilized approaches to accomplish this goal is the utilization of microprocessor systems that employ simultaneous multithreading ("SMT") an architecture that enables a single core to intelligently process two separate tasks or "threads" simultaneously.

FIG. 1A provides a simplified representation of a single-core microprocessor system 100 that utilizes SMT. As shown, in a first configuration core logic 102 is switchably linked (104) to register grouping A (106) and data path 108. Register grouping A stores instructions and data defining a first processor state for microprocessor system 100. Core logic 102 then utilizes its internal resources (e.g., Adder, Arithmetic Logic Unit) to process instructions and data, acquired from register grouping A, and returns results of the processing to register grouping A via data path 110. As internal resources within core logic 102 become available to accept instructions and data from register grouping B (112) (a condition that can occur while other internal resources of core logic 102 are still processing the instructions/data acquired from register grouping A), core logic is switchably linked (104) to register grouping B (112) (see FIG. 1B), register grouping B stores instructions and data defining a second processor state for microprocessor system 100. As shown, in this second configuration, core logic 102 is linked (104) to register grouping B (112) and data path 114 to permit the fetching of instructions and data from register grouping B. The available internal resources of core logic 102 can then process the instructions and data acquired from register grouping B (returning processing results to register grouping B via data path 116). The selective utilization of Register groupings A and B by single-core microprocessor system 100 enables the internal resources of core logic 102 to appear to be simultaneously processing instructions and data acquired from both register groupings (simultaneous multithread processing).

Although SMT processing enables a single physical processor to perform as if there were two separate logical processors within the microprocessor system, SMT is still constrained by the physical limitations of the associated register groupings (register groupings A and B in the above example). Within a given microprocessor, these associated register groupings are physical register groupings fabricated within the same monolithic semiconductor structure as the core logic. These physical register groupings have a fixed size and structure that dictate the amount of data that may be stored within them, and the manner in which such data can be stored and/or accessed. These register groupings are fixed, physical semiconductor structures within the microprocessor and cannot be modified or reconfigured. In addition, the processor's instruction set which defines how these fixed register groupings are addressed and accessed is also static, and cannot be reconfigured or altered.

The physical register groupings within modem microprocessors can each consist of a large number of individual registers. These sizable register groupings, combined with the static nature of the instruction for accessing the register groupings, typically result in a significant number of clock cycles being required for a given set of instructions or data to be acquired from the register grouping architecture and provided to a logic core. The larger the register grouping, the greater the possible clocking delay and consequential loss of processor efficiency.

Consequently, there exists a need for a system and method that provides the ability, at run-time, to dynamically define the configuration, capacity, and other aspects of the register files associated with one or more logic cores, and to provide the proper context to enable any associated logic core to access and execute the information contained in the dynamic register files, thereby achieving increased processing speed and efficiency.

BRIEF SUMMARY OF THE INVENTION

A system and method for virtual processor customization based upon the particular workload placed upon the virtual processor by one or more execution contexts within a given program or process. The customization serves to optimize the virtual processor architecture based upon a determination as to the size and/or type or virtual execution registers optimally suited for supporting a given execution context. This results in a time-variant processor architecture which not only provides optimized computational attributes, but also affords a high degree of inherent process security.

BRIEF DESCRIPTION OF THE DRAWINGS

The aspects, and advantages of the present invention will become better understood with regard to the following description, appended claims, and accompanying drawings in which:

DETAILED DESCRIPTION

Figure 2:
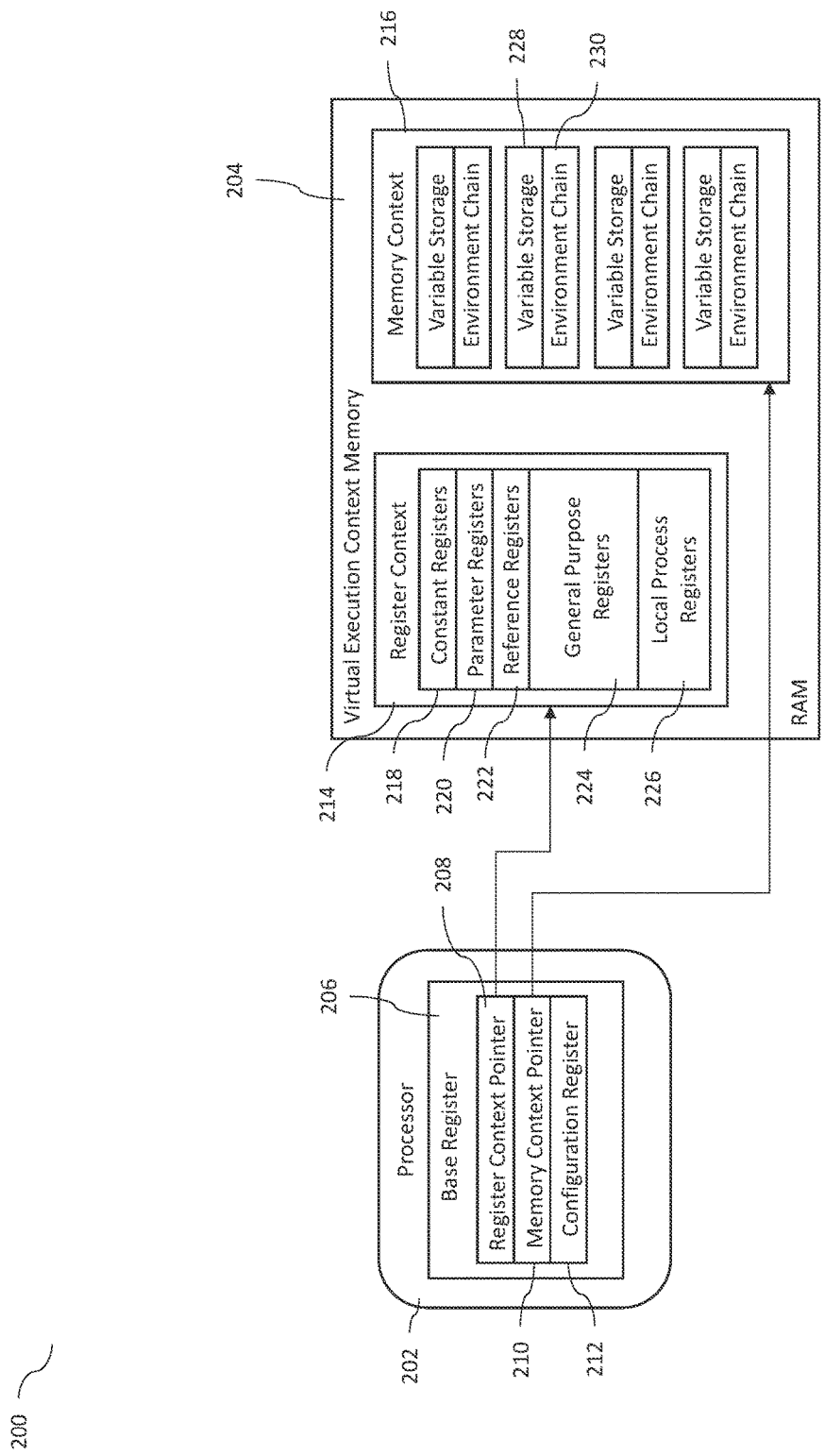
FIG. 2 is a functional block diagram of a processor and memory arrangement supporting a preferred embodiment of a system and method utilizing dynamic register files.

FIG. 2 is a functional block diagram of a processor and execution memory system (200) supporting a preferred embodiment of a system and method utilizing dynamic register files. As shown, system 200 consists of processor 202 and virtual execution context memory 204. Processor 202 includes base register contexts 206, register context pointer 208, memory context pointer 210, configuration register 212. Virtual execution context memory 204 is defined by software in a configurable random-access memory storage system, such as a DRAM or SRAM. The execution context memory stores information indicative of a register context (214) and an associated or paired memory context (216). Register context information 214 can include information typically associated with defining a processor state (i.e., processing a given thread), such as constant registers 218, parameter registers 220, reference registers 222, general purpose registers 224 and local process registers 226. Similarly, memory context information 216 within execution context memory 204 can include information such as variable storage information 228 and environment chain information 230.

Figure 1A:
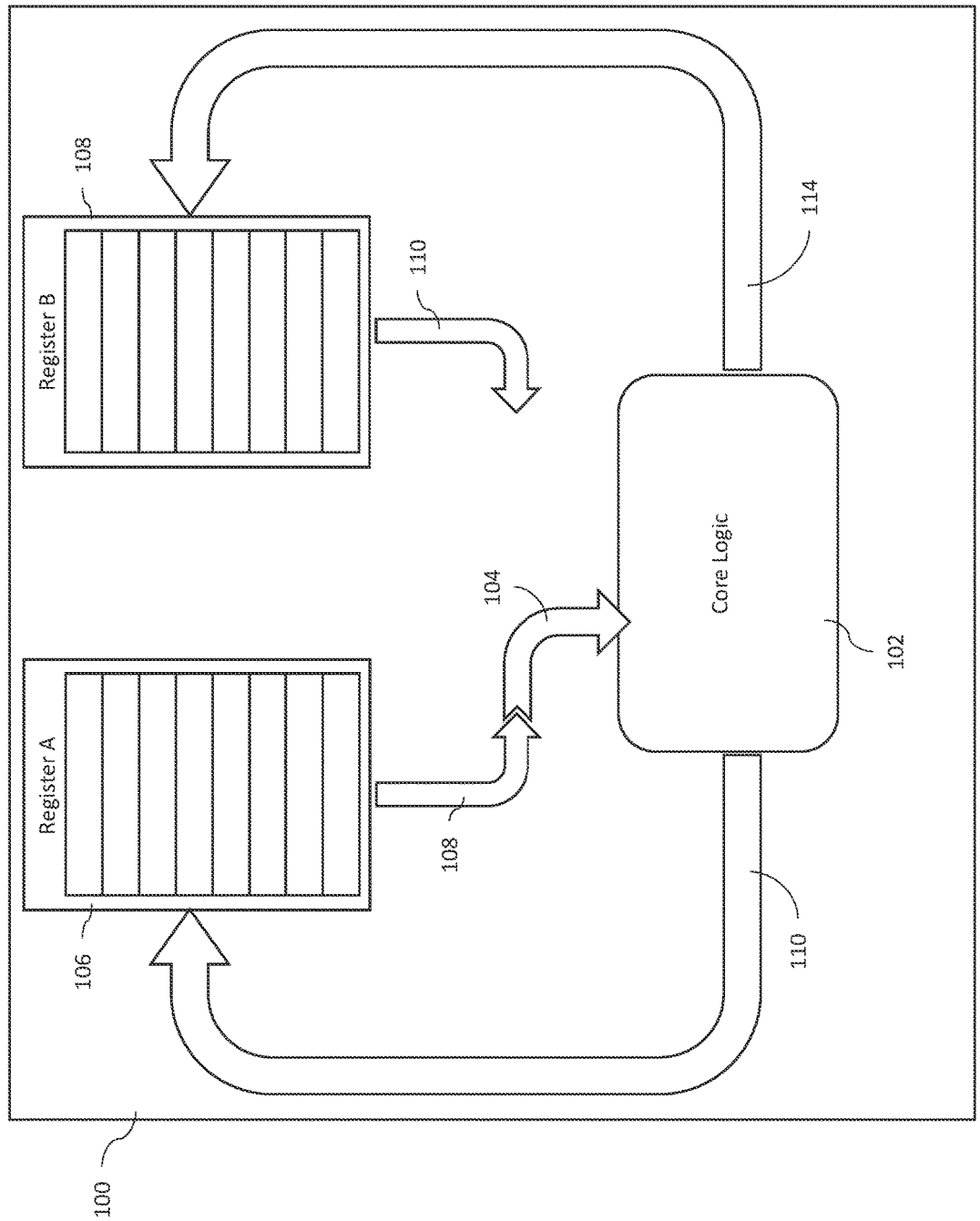
FIG. 1A is a simplified functional diagram of a single core microprocessor SMT system in a first configuration.
Figure 1B:
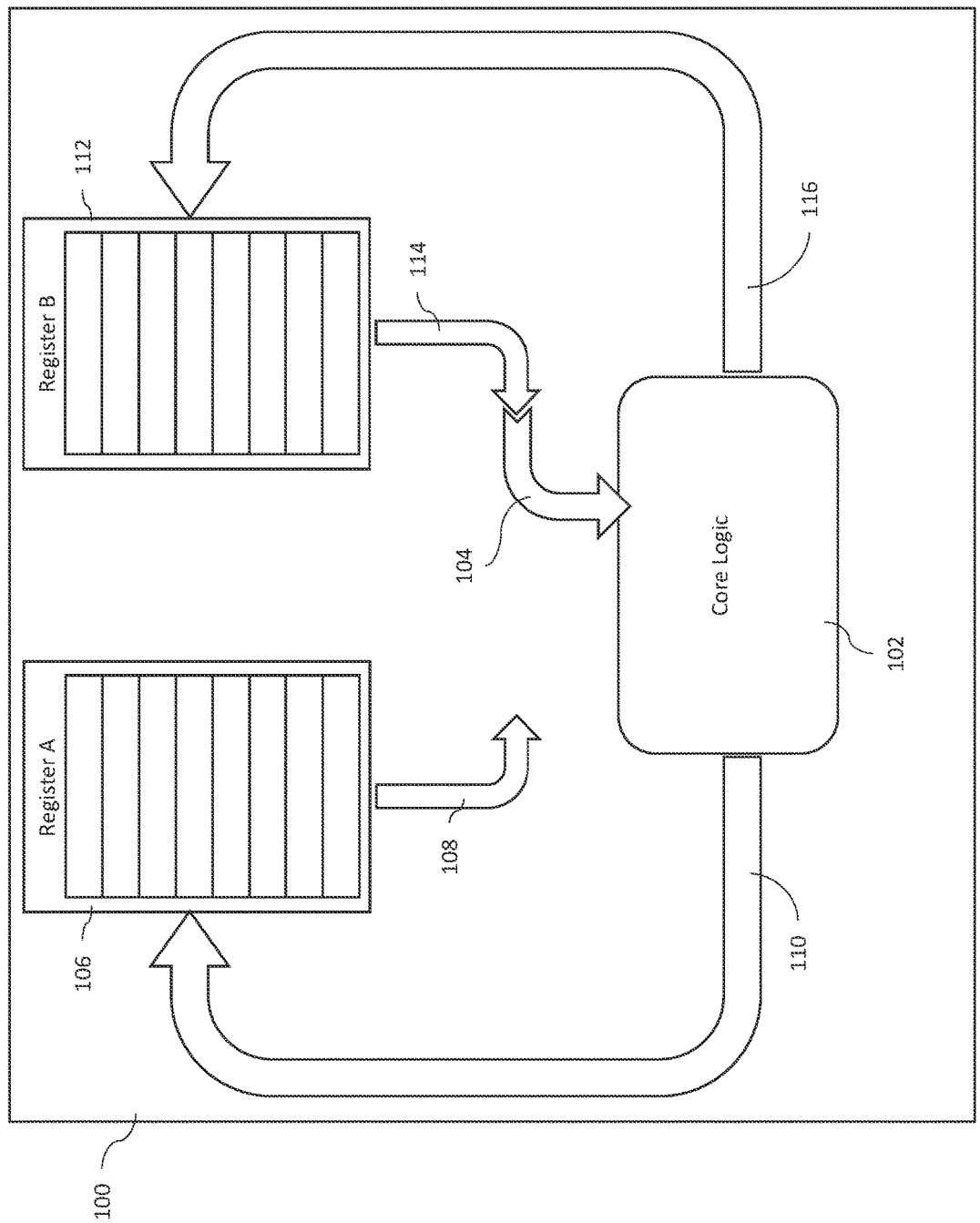
FIG. 1B is a simplified functional diagram of system of FIG. 1A in a second configuration.

The functionality of the system depicted in FIG. 2 is similar to that of the system depicted in FIGS. 1A and 1B, in as much as the information stored in virtual execution context memory 204 defines the state of processor 202. However, there are numerous critical advantages offered by system 200. For example, virtual execution context memory 204, being a software-defined construct within RAM is not comprised of fixed physical registers fabricated within a monolithic semiconductor structure housing a fixed core logic. Rather, execution context memory 204 is configured to have precisely enough capacity to contain the register context information 214 and paired memory context information 216 that define a given state of processor 202. "Right-sizing" the amount of RAM allocated for each of the associated registers, variable storage and/or environmental chains to define and support a particular state of processor enables the information contained in virtual execution context memory 204 to be accessed very efficiently. This right-sizing can be performed at run-time so as to dynamically define the amount of memory within the configurable random-access memory storage system designated for each of the registers, chains and variable stores within execution context 204.

For example, if defining a particular processor state required 1 Mbytes of parameter register context information 214, then 1M byte of space within random-access memory storage system would be designated for that purpose. Similarly, if 256 Kbytes of memory context information 216 was required to define a particular processor state, then 256 Kbytes of RAM would be designated for that purpose within virtual execution context memory 204. This permits processor 202 to access requisite information from execution context memory 204 without the inherent inefficiency introduced by a fixed physical register structure that is likely to have a capacity far in excess of what is required to support the register context information (214) or memory context information (216) required to define a particular processor state.

Register context pointer 208 within processor 202 provides the particular RAM address at which the register context information is stored. Similarly, processor 202's memory context pointer 210 provides the particular RAM address at which the memory context information is stored. The requisite context information is efficiently retrieved and processed, enabling processor 202 to efficiently assume a defined state and process an associated thread. This direct access of right-sized execution context information also permits processor 202 rapidly switch between one state or thread and another, offering greatly improved processor efficiency when compared to a conventional fixed register processor architecture.

The system and method disclosed above offer an additional advantage over conventional, fixed-in-silicon core and register processor architecture. In such conventional processor architecture, the stored memory context information relates to the entire platform. If such platform-wide information were to be breached, it could provide a basis for platform-wide unauthorized access and the compromising of all of the information associated with the platform. Contrastingly, the disclosed system and method utilize context pointers within a logical processor. These context pointers (register context, memory context, etc.) are not accessible outside of the execution context in which they reside. Furthermore, each pointer only provides direction to a specific RAM location and would not provide any indicia useful in attaining unauthorized platform-wide access. There is simply is no platform-wide information stored within the base registers. In fact, the architecture in the system described above fails to even have a platform that could be viewed as analogous (and therefore as vulnerable) to the physical semiconductor structure upon which present microprocessor technology is typically fabricated.

Figure 3:
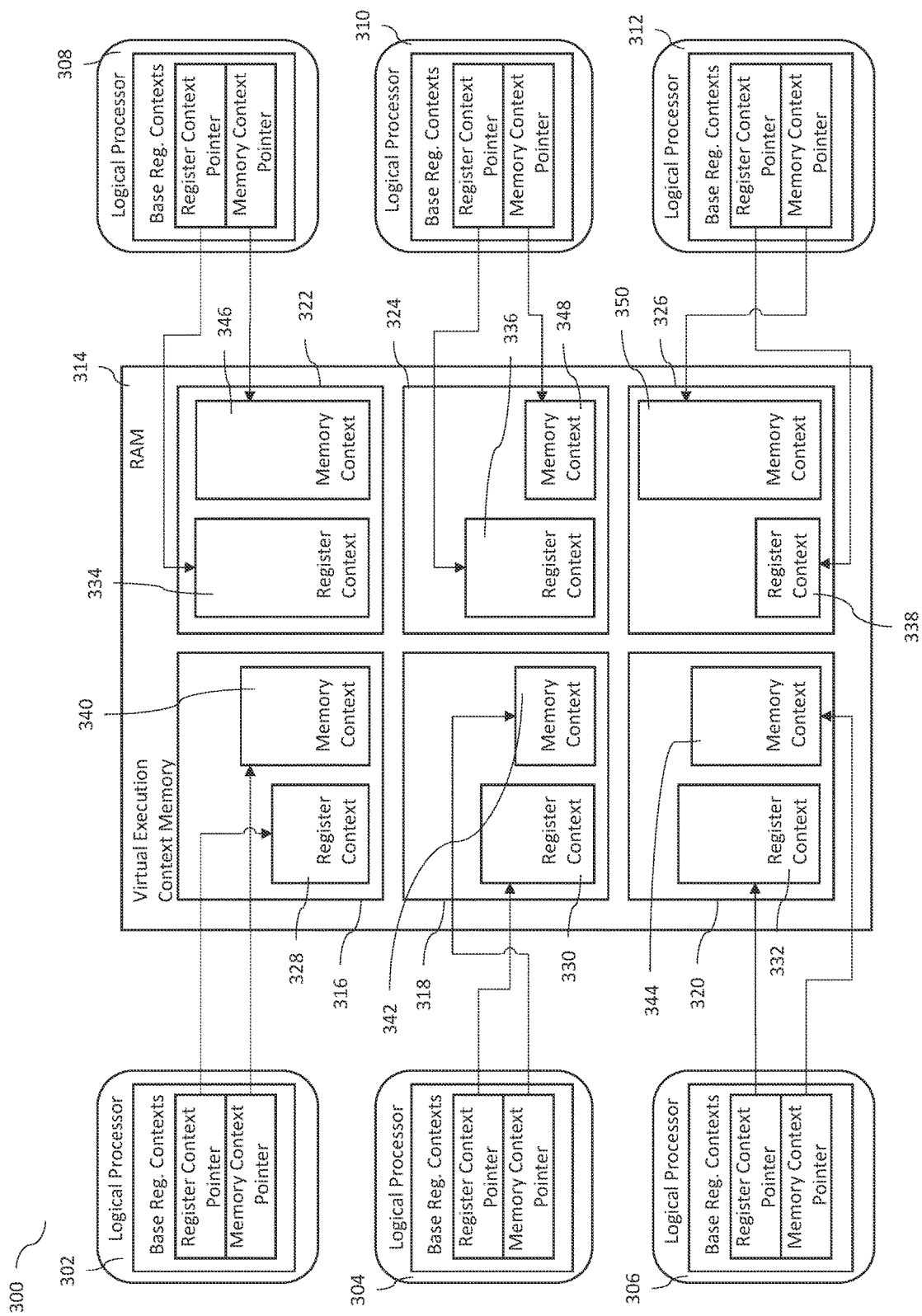
FIG. 3 is a functional block diagram of logical processor and memory arrangement supporting a preferred embodiment of a system and method utilizing dynamic register files.

Processor 202 can be a processor utilizing a single core system (similar to the processor depicted in system 100 of FIGS. 1A and 1B), or a processor employing a multi-core architecture. Each of the cores being capable of utilizing SMT or a similar strategy to perform as two or more logical processors, wherein the state of a given a logical processor would be defined by the accessed register context information and memory context information. A functional block diagram of one such multi-logic core system (300) is illustrated in FIG. 3. As shown, system 300 includes six logical processors (302-312) configured to access virtual execution context memory 314. These logical processors each include base register context information (316-326), which although critical to the operation of processor 202, typically reside outside of the physical package housing the processors logic core(s) so as to enable them to be utilized by other active execution processes.

Each of the logical processors (302-312) respectively accesses one pair of register context information 328-338 and memory context information 340-350 within virtual execution context memory 314. The logical processors then each execute the thread defined by the respective paired register and memory context information. As internal resources within a logical processor become available to accept instructions and data associated with a different thread, the logical processor can access alternate register and memory context information pairs within virtual execution context memory 314. For example, assume that resources within logical processor 302 become available after completing the processing of a thread that was defined by register context information 328 and memory context information 340. Virtual processor 302 could then be utilized to execute a thread defined by accessing register context information 330 and memory context information 342.

Figure 4:
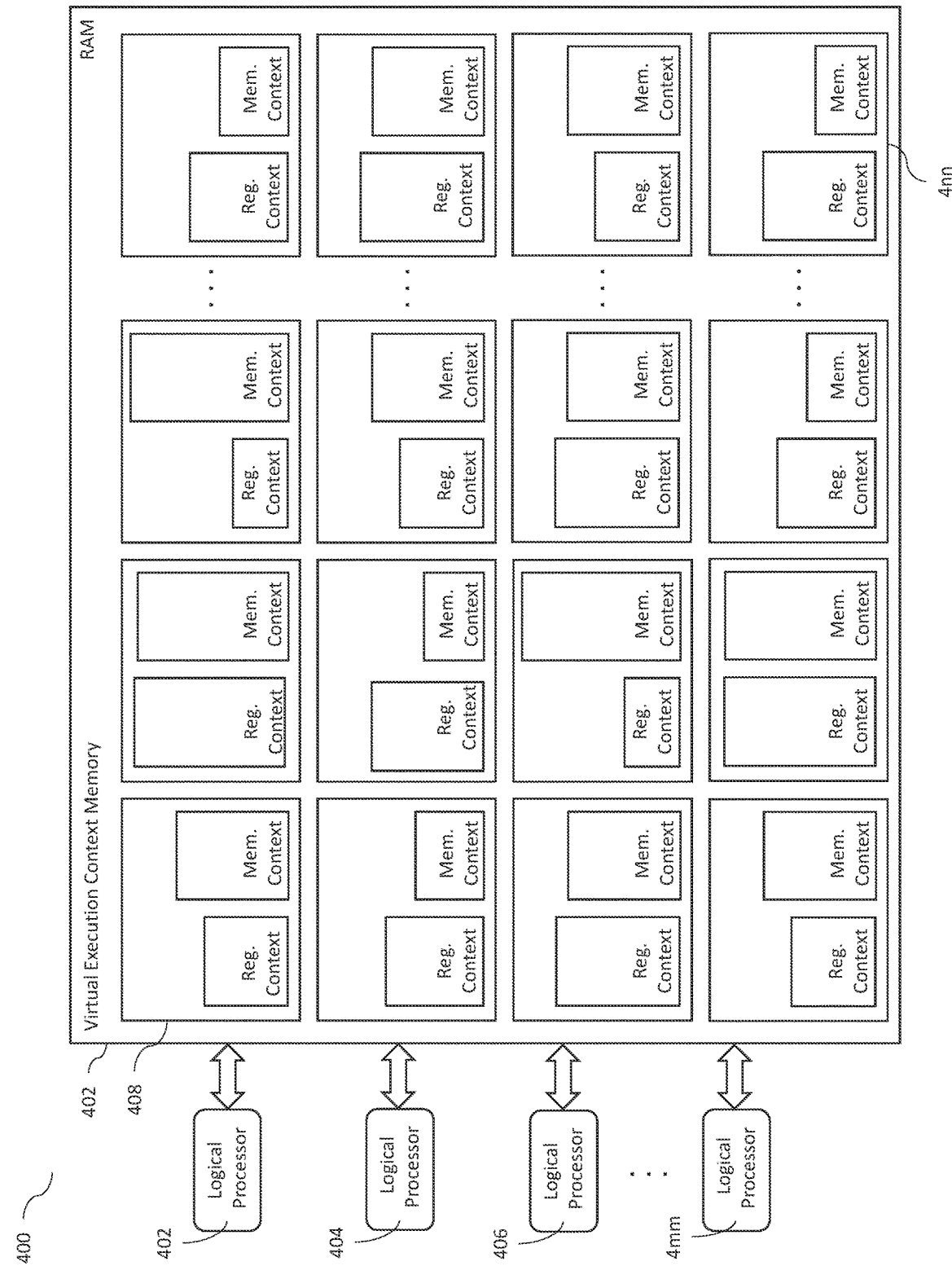
FIG. 4 is a functional block diagram of a system of multiple logical processors and a memory arrangement supporting an alternate preferred embodiment utilizing dynamic register files.

As previously stated, the paired register context and memory context information is stored within RAM, and consequently it will be understood that that the number of such pairings is limited only by the size of the available RAM. FIG. 4 provides a functional block diagram of a system (400) wherein virtual execution context memory 402 includes paired register and memory context information 408 through 4$nn$. These right-sized register and memory context pairings define a different processor state for processing a particular thread. Each of the register and memory context pairings is accessible by any one of logical processors 402-4$mm$, utilizing register and memory context pointer information stored within each logical processor. This enables any available resources within any one of the six logical processors to assume the state and execute the thread defined by any one the of the register and memory context pairings stored within virtual execution context memory 402.

Figure 5A:
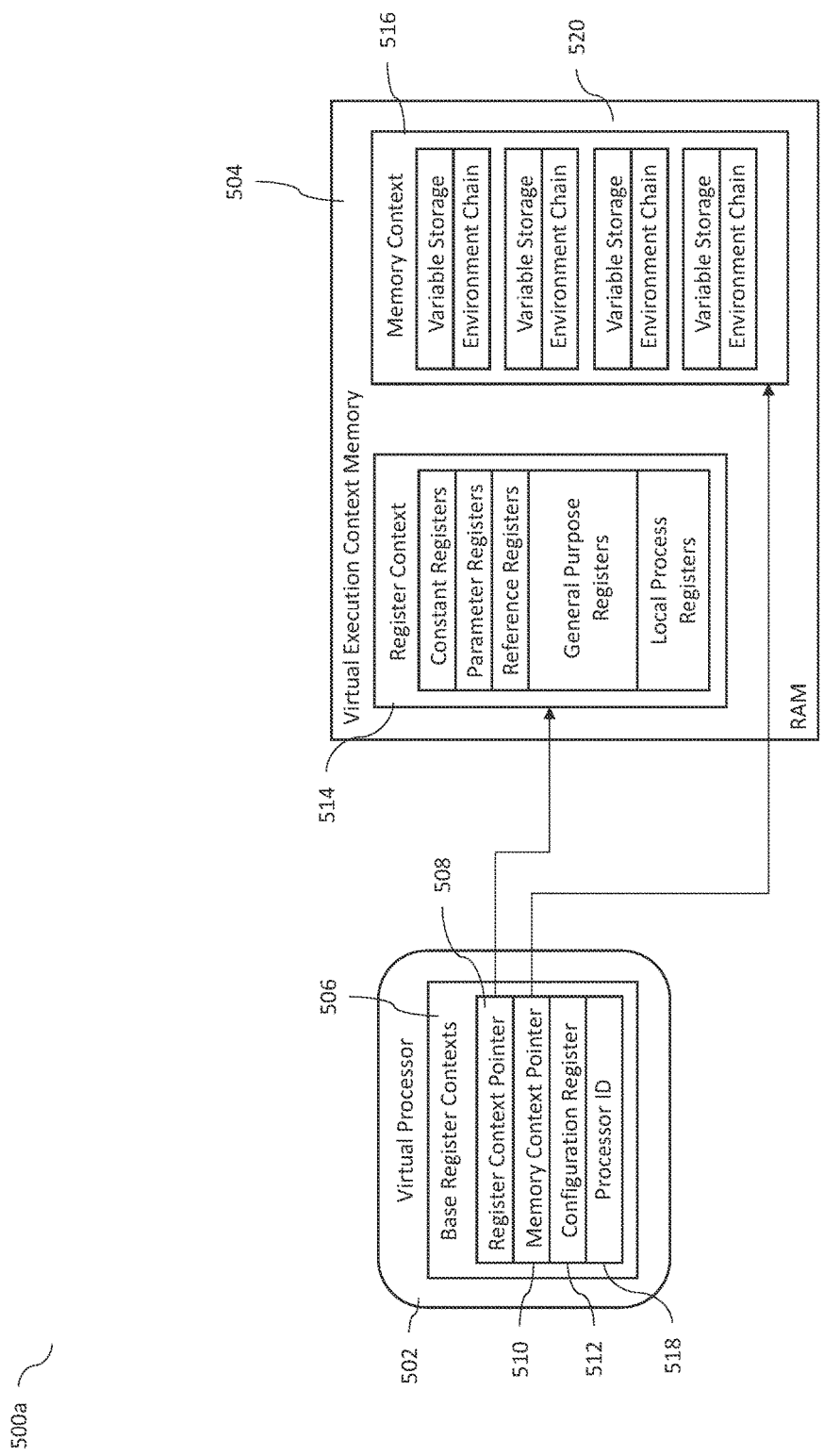
FIG. 5A is a functional block diagram of a virtual processor system and memory arrangement supporting an additional preferred embodiment utilizing dynamic register files.

An additional embodiment of the above system and method utilizes a virtual processor in conjunction with execution context memory. As shown in FIG. 5A, virtual processor system 500a is similar to the system depicted in FIG. 2. Virtual execution context memory 504 is a software-defined construct within RAM and configured at the initial run-time of a given process or program to have precisely enough capacity to contain the register context information 514 and paired memory context information 516 required to support the operations that will be executed over the entirety of the given process/program. Register context pointer 508 provides the particular RAM address at which the register context information is stored, and memory context pointer 510 provides the particular RAM address at which the memory context information is stored. However, unlike the system of FIG. 2, the processor (502) in which these context pointers reside is a virtual processor. Virtual processor 502 is comprised of information indicative of a register context pointer (508), a memory context pointer (510). Virtual processor 502 can also include other configuration register information (512) required to specify a given virtual processor state, as well as virtual processor identification information (518), which would serve to distinguish between individual virtual processors in systems employing multiple virtual processors. As with the virtual execution context information (514) of system 500a, the information comprising virtual processor 502 is stored within RAM (see FIG. 5B). The processor is effectively virtualized in a manner similar to that of a thread or processor state, and the virtual processor information is processed one or more logic cores as assets become available. In the system (500b) depicted in FIG. 5B, the information representing the virtual processor can be stored within the same RAM (520) utilized for storage of the virtual execution context information.

In all of the systems and methods that have been described, the state and configuration of the processor (be it virtual or otherwise) is defined at the run-time of a given process or program. That is, the number and types of registers, as well as the resources to support the requisite memory context, are defined so that the operations executed over the entirety of the given process/program will be supported. Although this specification of these resources is can be viewed as dynamic as it is a function of the particular resource requirements for a specific process/program, and will be redefined prior the execution of a new process/program by the virtual processor, the definition remains static throughout the execution of any given process or program.

Figure 6:
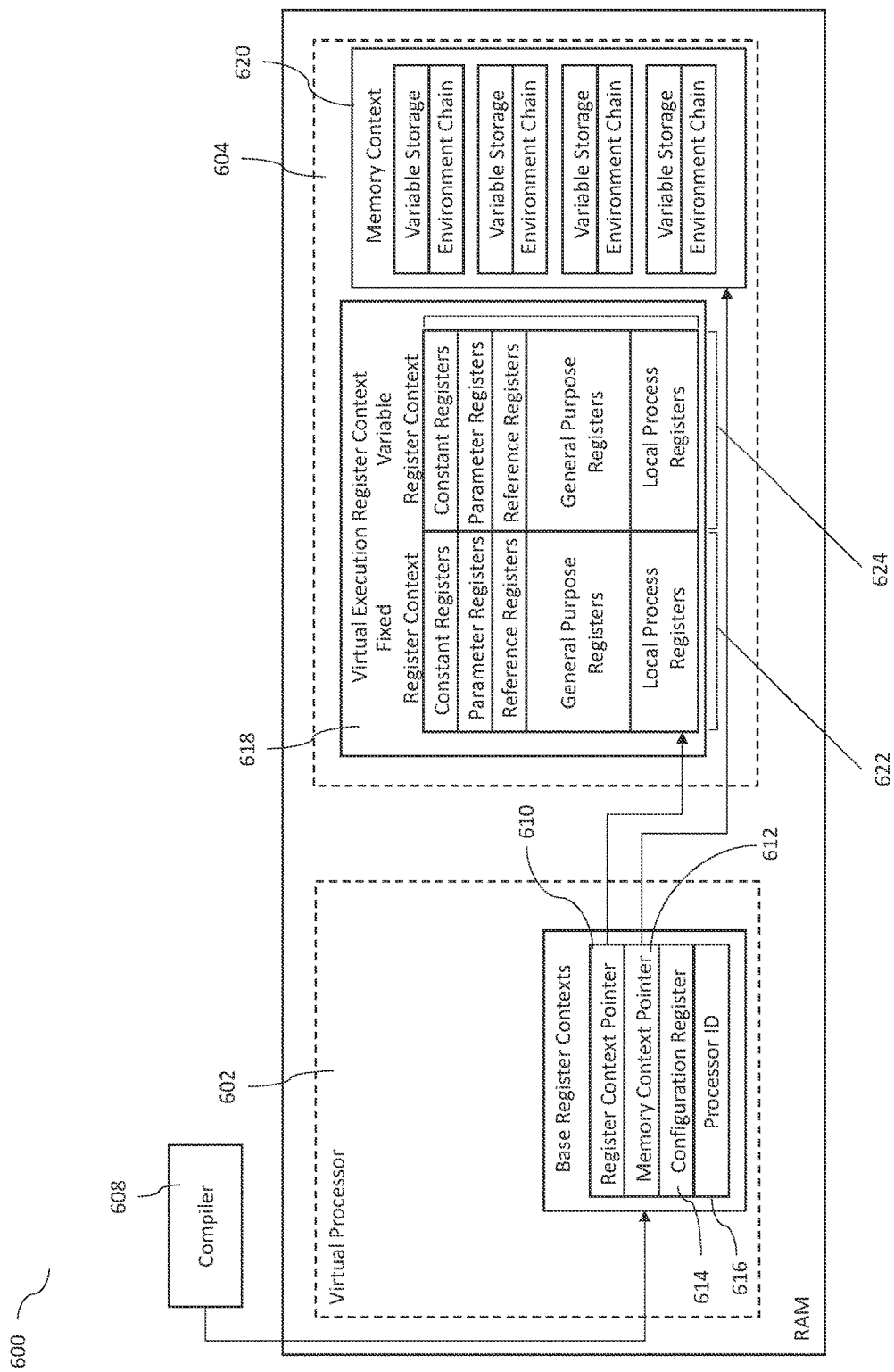
FIG. 6 is a functional block diagram of a virtual processor system and memory arrangement enabling software-controlled processor customization.

The embodiment of the invention illustrated in FIG. 6 provides for a system and method wherein the particular resources supporting a process/program are dynamically adjusted to accommodate the workload at any given point within a process/program. This effectively changes the very geometry of the virtual processor executing a process/program as a function of processor workload, thereby enabling execution efficiency and security to be further optimized.

Figure 5B:
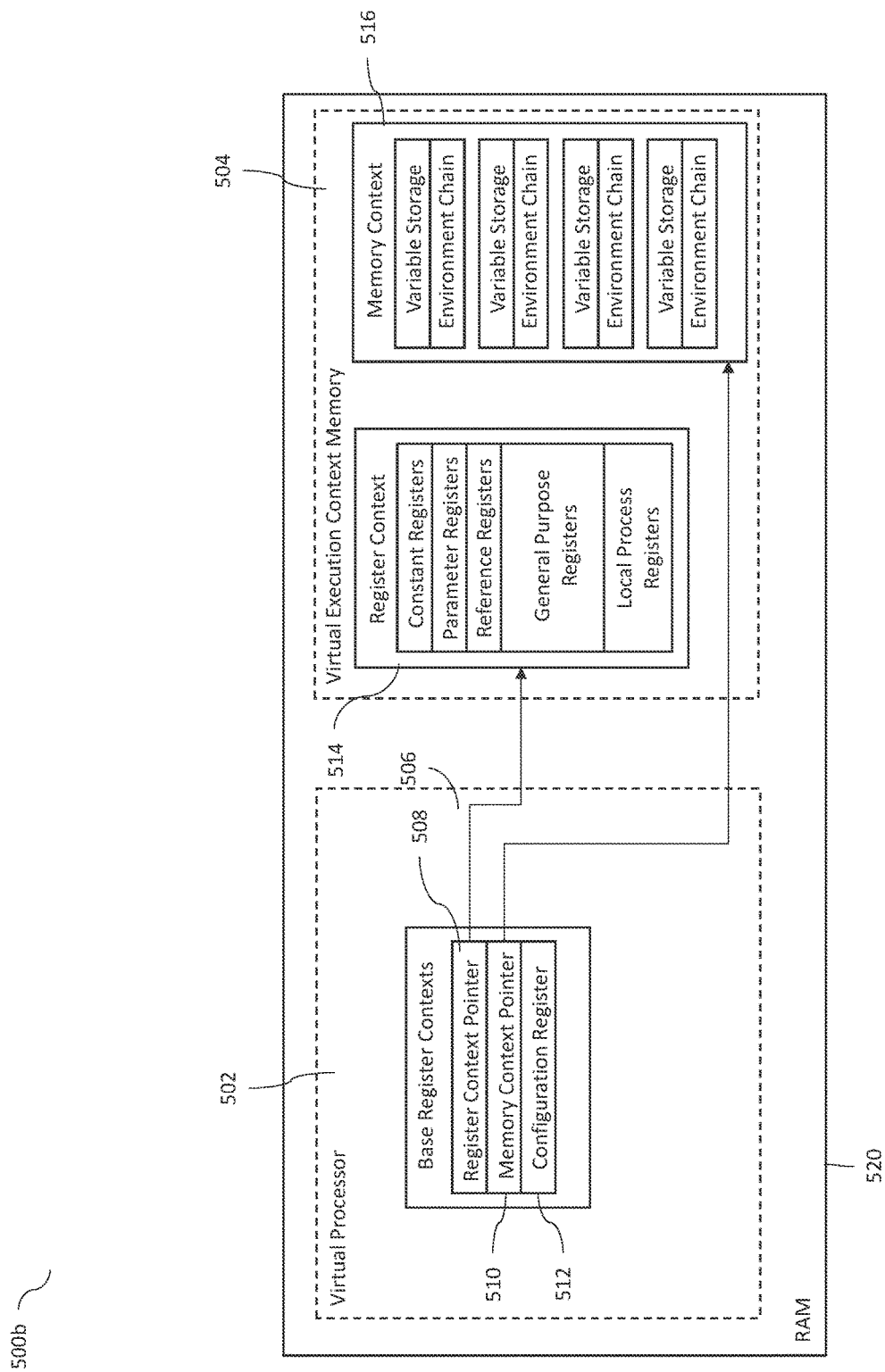
FIG. 5B is a functional block diagram of an alternate virtual processor system and memory arrangement supporting yet another preferred embodiment utilizing dynamic register files.

As shown, in FIG. 6, a system 600 includes virtual processor 602 and virtual execution context memory 604. Virtual processor 602 is comprised of information indicative of a compiler (608), register context pointer (610), a memory context pointer (612). Virtual processor 602 may also include other configuration register information (614) required to specify a given virtual processor state, as well as virtual processor identification information (616), which would serve to distinguish between individual virtual processors in systems employing multiple virtual processors. Virtual execution context memory 604 is a software-defined construct within RAM and includes register context information 618 and paired memory context information 620 which support the operations that will be executed during a given process/program. The primary operation and interaction of the various components of system 600 are similar to the like-named components of system 500b (FIG. 5B). However, system 600 employs a compiler adapted to determine the precise number and size of the register resources required to support each instruction in the stream of instructions that comprises a given process/program. Compiler 608 is a software construct adapted to interpret a language source code, and emits a code file comprised of machine code targeted for a specific execution environment. The compiler can be resident in the same system that supports virtual processor 602 and/or execution context memory 604, or be supported by a wholly separate system. Further, the compiler can be a virtual compiler.

The compiler in system 600 operates to provide a code file defining the specific execution environment for virtual processor 502. This code file would include at least one base instruction set ("IS 0"), enabling the initialization of the virtual processor. Compiler 608 is further adapted to provide one or more additional instruction sets so as to configure virtual processor 602 to support both fixed length (622) and/or variable (624) length virtual execution registers. As the compiler processes each instruction, it computes the optimal number, type and size of the registers required to support and execute that particular instruction, or subset of instructions comprising a given execution context with the overall process/program.

In a first embodiment, system 600 is utilized to allocate a set of fixed registers as a function of particular individual instructions within a given execution context. This could be implemented as a function of a single parameter indicative of the number of static registers to be allocated. In this embodiment, all registers are of a uniform size, and therefore the size is inherently known. So, an instruction could for example allocate 64 static registers, starting at register offset 00, and being continuous through register 63. These 64 registers remain allocated until the termination of the execution context. In a 32-bit processor system, the register width would most likely be 32 bits; in a 64-bit processor system, the register width would most likely be 64 bits.

System 600 could also be adapted to allocate multiple types of registers on the basis are allocated on the basis of particular individual instructions within a given execution context. As shown in FIG. 6, these registers can include general-purpose registers, constant registers, parameter registers, and reference registers. This allocation can be executed on the basis of an instruction comprised of a single parameter, A=15. This parameter would be interpreted by system 600 as specifying the allocation of 15 general purpose registers, 15 constant registers, 15 parameter registers, and 15 reference register. This makes for a compact and efficient instruction, but runs the risk of wasting register space for the register types that do not require the maximum count of 15.

An alternate methodology could employ an instruction having a more complex structure and specify the allocation use a form of A=(20, 50, 12, 30). This would be indicative of the allocation 20 general purpose registers, 50 constant registers, 12 parameter registers, and 30 reference registers. Each of these registers would be of identical width.

Yet another instruction schema suitable for use with system 600 supports the allocation of registers having unequal widths. For example, assume system 600 has a somewhat limited address space, but the capability to support large numeric representations. In such in architecture the width of a general-purpose registers, constant registers, and parameter registers would be large, such as 128 bits, while the reference registers storing addresses would be a more modest 32 bits. An allocation instruction of the form A=[(20, 128), (50, 128), (12, 128), (30, 32)] would result in the allocation of 20 128-bit general purpose registers, 50 128-bit constant registers, 12 128-bit parameter registers, and 30 32-bit reference registers. This amount of memory required to hold each register type being dictated by the register type itself. This optimizes the memory allocation for the register set, as the byte offsets to the registers can be easily calculated from the register number and register type, and maintains a consistent instruction set register numbering scheme across all register types.

The allocation instruction could also be of a format that specified the register width along with the register type, so as to provide an even more dynamic and flexible use of register memory. For example, many machine learning programs utilize a 16-bit arithmetic width to support high-speed calculations while sacrificing a certain degree of accuracy. In executing such a program, an architecture could be allocated to permit general-purpose, constant, and parameter registers to be of varying widths. An allocation instruction of A=[(20 64), (20 16), (25 64), (25 16), (12 64), (30 64)] would be indicative of the following register configuration:

20 64-bit general purpose registers;
20 16-bit general purpose registers;
25 64-bit constant registers;
25 16-bit constant registers;
12 64-bit parameter registers; and
30 64-bit reference registers.

The specific execution context supported by the specified registers being precisely configured for the machine learning task at hand.

An alternate allocation command sequence of four separate instructions wherein each one specified type, quantity and width of the requisite registers could also achieve the same end result. For example:

A=0 20 64, 0 20 16;
A=1 25 64, 1 25 16;
A=2 12 64; and
A=3 30 64.

In this instruction format, the first number of the ASRS instruction delineates the type; 0=General Purpose, 1=Constant, 2=Parameter, 3=Reference.

It should also be understood that although the register allocation systems, parameters and processes described above were focused upon providing the allocation of particular registers having a type and a size (width) based primarily upon optimizing the execution of particular instructions within a given execution context, the inherent security aspects provided by such are significant. The very nature of the register allocation system and processes discussed above is dynamic in the time domain. Any state or information available at a given time is transient. An external entity observing or accessing this dynamic system (perhaps without permission) would be observing what would appear to be an unstable system, presenting information that appeared to vary randomly in size and location. Without the proper context for a given state of the dynamic system (which would be wholly unavailable to an unauthorized third party), the information would likely yield little or no discernable intelligence with respect to the process being executed. The inherent security aspects of this dynamism are obvious. Consequently, utilization of such a system could be motivated in whole or in part by the provision of a secure virtual environment for the execution of particularly sensitive or private processes.

Although the invention herein has been described with reference to particular embodiments, it is to be understood that these embodiments are merely illustrative of the principles and applications of the present invention. The invention could be implemented utilizing a variety of physical topologies and circuitry. It could be implemented in a monolithic architecture, or across a number of interconnected discrete modules or circuit elements, including elements linked by means of a network.

The invention claimed is:

1. A system for defining and accessing registers comprising:
   at least one virtual processor comprising information indicative of at least one compiler that is adapted to analyze at least a portion of an executable context defining at least one particular process to executed upon at least one virtual processor and responsively produce at least one instruction set indicative of a virtual execution register context customized to support the at least one executable process;
   at least one virtual execution context memory comprising stored information defining a particular virtual processor state, wherein the information defining the particular virtual processor state is stored as register context information and paired memory context information in a specific portion of a first addressable memory and based, at least in part, upon the at least one instruction set, wherein the at least one virtual execution context memory is defined by software in a configurable random-access memory storage system at run-time to have the precise capacity based on the register context information and the paired memory context information that define the processor state; and
   the at least one virtual processor comprising information stored in a specific portion of a second addressable memory, the stored information defining at least one base register pointer, wherein the at least one base register pointer comprises at least one memory address enabling the at least one virtual processor to access the specific portion of the first addressable memory storing the information defining the particular virtual processor state.

2. The system of claim 1 further comprising at least one logic core adapted to execute a process utilizing the information defining the particular virtual processor state.

3. The system of claim 1 wherein the at least one base register pointer comprises at least one of the following:
   a memory context pointer; and
   a register context pointer.

4. The system of claim 1 wherein the compiler comprises a virtual compiler, wherein the compiler is a software construct adapted to interpret a language source code and emits a code file comprised of machine code.

5. The system of claim 1 wherein the first and second addressable memories are both located within a single physical addressable memory device.

6. The system of claim 1 wherein the addressable memory comprises at least one of the following:
   static random-access memory;
   dynamic random-access memory; and
   non-volatile memory.

7. The system of claim 1 wherein the virtual execution register context customized to support the at least one executable process is determined based, at least in part, upon the at least one of the following:
   the available capacity of the first addressable memory; and
   the type of processing required to execute the portion of an executable context defining at least one particular process to be executed upon the at least one virtual processor.

8. The system of claim 1 wherein the virtual execution register context customized to support the at least one executable process comprises information indicative of at least one of the following:
   register type; and
   register size.

9. The system of claim 8 wherein the register type comprises at least one of the following:
   a register of fixed size; and
   a register of variable size.

10. The system of claim 8 wherein the register size comprises a specific register bit width.

11. A method for defining and accessing registers comprising:
   using a compiler, analyzing at least a portion of an executable context defining at least one particular process to executed upon at least one virtual processor and responsively produce at least one instruction set indicative of a virtual execution register context optimized to support the at least one executable process, wherein the compiler is a software construct adapted to interpret a language source code and emits a code file comprised of machine code;
   storing, in a specific portion of a first addressable memory, information based, at least in part, upon the at least one instruction set, wherein the stored information includes register context information and paired memory context information and defines a particular virtual processor state, wherein the specific portion of the first addressable memory is defined by software in a configurable random-access memory storage system at run-time to have the precise capacity based on the register context information and the paired memory context information that define the processor state; and
   virtualizing at least one processor comprising information stored in a specific portion of a second addressable memory, the stored information defining at least one base register pointer, wherein the at least one base register pointer comprises at least one memory address enabling the at least one virtual processor to access the specific portion of the first addressable memory storing the information defining the particular virtual processor state.

12. The method of claim 11 wherein the virtualization comprises utilizing at least one logic core adapted to execute a process utilizing the information defining the particular virtual processor state.

13. The method of claim 11 wherein the at least one base register pointer comprises at least one of the following:
   a memory context pointer; and
   a register context pointer.

14. The method of claim 11 wherein the first and second addressable memories are both located within a single physical addressable memory device.

15. The method of claim 11 wherein at least one of the first and second addressable memories comprises at least one of the following:
   static random-access memory;
   dynamic random-access memory; and
   non-volatile memory.

16. The method of claim 11 wherein the determination of the virtual execution register context customized to support the at least one executable process is based, at least in part, upon the at least one of the following:
   the available capacity of the first addressable memory; and
   the type of processing required to execute the portion of an executable context defining at least one particular process to be executed upon the at least one virtual processor.

17. The method of claim 11 wherein the virtual execution register context customized to support the at least one executable process comprises information indicative of at least one of the following:
   register type; and
   register size.

18. The method of claim 17 wherein the register type comprises at least one of the following:
   a register of fixed size; and
   a register of variable size.

19. The method of claim 17 wherein the register size comprises a specific register bit width.

* * * * *